(12) United States Patent
Lyu et al.

(10) Patent No.: US 11,370,062 B2
(45) Date of Patent: Jun. 28, 2022

(54) MULTIFUNCTIONAL SHAFT APPARATUS

(71) Applicants: METAL INDUSTRIES RESEARCH & DEVELOPMENT CENTRE, Kaohsiung (TW); PARFAITE TOOL CO., LTD., Tainan (TW)

(72) Inventors: Yu-Ting Lyu, Kaohsiung (TW); Yu-Fu Lin, Kaohsiung (TW); Jui-Teng Chen, Tainan (TW); Chih-Hung Chou, Tainan (TW)

(73) Assignees: METAL INDUSTRIES RESEARCH & DEVELOPMENT CENTRE, Kaohsiung (TW); PARFAITE TOOL CO., LTD., Tainan (TW)

( * ) Notice: Subject to any disclaimer, the term of this patent is extended or adjusted under 35 U.S.C. 154(b) by 327 days.

(21) Appl. No.: 16/699,090

(22) Filed: Nov. 28, 2019

(65) Prior Publication Data

US 2020/0189030 A1 Jun. 18, 2020

(30) Foreign Application Priority Data

Nov. 29, 2018 (TW) ................................. 107142761

(51) Int. Cl.
*B23K 26/067* (2006.01)
*B23K 26/16* (2006.01)
(Continued)

(52) U.S. Cl.
CPC ...... *B23K 26/0676* (2013.01); *B23K 26/0093* (2013.01); *B23K 26/0643* (2013.01);
(Continued)

(58) Field of Classification Search
CPC ............... B23K 26/0093; B23K 26/70; B23K 26/0676; B23K 26/067; B23K 26/16;
(Continued)

(56) References Cited

U.S. PATENT DOCUMENTS

| | | | | |
|---|---|---|---|---|
| 2004/0182842 A1* | 9/2004 | Denney | .............. | B23K 37/0217 219/121.84 |
| 2016/0101492 A1* | 4/2016 | Chuang | .............. | B23K 26/0093 409/136 |

FOREIGN PATENT DOCUMENTS

| | | |
|---|---|---|
| CN | 101048256 A | 10/2007 |
| CN | 101537538 A | 9/2009 |

(Continued)

*Primary Examiner* — Dana Ross
*Assistant Examiner* — Kuangyue Chen
(74) *Attorney, Agent, or Firm* — CKC & Partners Co., LLC

(57) ABSTRACT

A multifunctional shaft apparatus includes a shaft base, a spindle, a tool holder, an ultrasonic vibration assembly, a laser light source and a mirror assembly. The spindle is disposed in the shaft base. The spindle has a laser channel extending along the spindle. The tool holder is disposed on the spindle. The tool holder has a hollow passage, an inner space and a recessed portion. The hollow passage is communicated with the laser channel. An inner wall of the hollow passage has at least one through hole communicated with the inner space, and the recessed portion is disposed on a bottom surface of the tool holder. The bottom surface has a light outlet. The ultrasonic vibration assembly includes a vibration member disposed in the recessed portion. The mirror assembly is disposed in the tool holder and is configured to reflect the laser light beam generated by the laser light source.

4 Claims, 2 Drawing Sheets

(51) Int. Cl.
*B23K 26/00* (2014.01)
*B23K 26/06* (2014.01)
*B23K 26/70* (2014.01)
*G02B 27/14* (2006.01)

(52) U.S. Cl.
CPC .............. *B23K 26/16* (2013.01); *B23K 26/70* (2015.10); *G02B 27/14* (2013.01)

(58) Field of Classification Search
CPC .... B23K 26/0643; B23K 26/60; G02B 27/14; G02B 27/144; B26D 7/086
See application file for complete search history.

(56) References Cited

FOREIGN PATENT DOCUMENTS

| | | | |
|---|---|---|---|
| CN | 201572951 | U | 9/2010 |
| CN | 102430904 | A | 5/2012 |
| CN | 102773605 | A | 11/2012 |
| CN | 103203552 | A | 7/2013 |
| CN | 203110021 | U | 8/2013 |
| CN | 203371169 | U | 1/2014 |
| CN | 203712073 | U | 7/2014 |
| CN | 104493276 | A | 4/2015 |
| CN | 204381833 | U | 6/2015 |
| CN | 104959461 | A | 10/2015 |
| CN | 107097072 | A | 8/2017 |
| CN | 207155239 | U | 3/2018 |
| CN | 107962097 | A | 4/2018 |
| CN | 108555432 | A | 9/2018 |
| TW | M372763 | U * | 9/2009 |
| TW | M372763 | U | 1/2010 |
| TW | M455583 | U1 | 6/2013 |
| TW | 201521932 | A | 6/2015 |
| WO | 2008156116 | A1 | 12/2008 |

* cited by examiner

MULTIFUNCTIONAL SHAFT APPARATUS

RELATED APPLICATIONS

This application claims priority to Taiwan Application Serial Number 107142761, filed on Nov. 29, 2018, which is incorporated herein by reference.

BACKGROUND

Field of Invention

The present invention relates to a shaft apparatus. More particularly, the present invention relates to a multifunctional shaft apparatus having a laser heating function as well as an ultrasonic vibration function.

Description of Related Art

In a general cutting process, a cutting tool of a processing machine is used to cut a workpiece. When the workpiece is a high-strength or high-hardness material, such as a superalloy or a ceramic-based composite material, general cutting processing method is likely to cause a wear problem and a decrease of service life and cutting efficiency of the cutting tool, thus affecting the cutting quality.

Therefore, how to improve the cutting efficiency and the cutting quality of processing machines has become a goal for related industries.

SUMMARY

The invention provides a multifunctional shaft apparatus which can effectively improve a processing efficiency and a processing quality.

According to the aforementioned object, a multifunctional shaft apparatus is provided. The multifunctional shaft apparatus is suitable to be installed on a processing machine. The multifunctional shaft apparatus includes a shaft base, a spindle, a tool holder, an ultrasonic vibration assembly, a laser light source and a mirror assembly. The shaft base has an accommodating space. The spindle is disposed in the accommodating space, in which the spindle has a laser channel extending along an axis direction of the spindle. The tool holder is disposed on the spindle. The tool holder has a hollow passage, an inner space and a recessed portion, in which the hollow passage extends along the axis direction and is communicated with the laser channel, and an inner wall of the hollow passage is set with at least one through hole which is communicated with the inner space, and the recessed portion is disposed on a bottom surface of the tool holder which is away from the spindle, in which the bottom surface has a light outlet which is communicated with the inner space. The ultrasonic vibration assembly includes a vibration member disposed in the recessed portion of the tool holder. The laser light source is configured to generate a laser light beam. The mirror assembly is disposed in the tool holder, and the mirror assembly is configured to reflect the laser light beam, such that the laser light beam is emitted into the tool holder and is further emitted out from the light outlet.

According to an embodiment of the present invention, the ultrasonic vibration assembly further includes a power supply disposed in the accommodating space and electrically connected to the vibration member.

According to an embodiment of the present invention, the spindle and the tool holder are conductive bodies, and the power supply is electrically connected to the spindle and the tool holder so as to provide electric power to the vibration member.

According to an embodiment of the present invention, the spindle and the tool holder are conductive bodies, and the power supply is electrically connected to the spindle and the tool holder so as to provide electric power to the vibration member.

According to an embodiment of the present invention, the mirror assembly includes a first reflecting mirror and a second reflecting mirror. The first reflecting mirror is disposed in the hollow passage of the tool holder, in which the first reflecting mirror is configured to reflect the laser light beam to the inner space of the tool holder through the through hole. The second reflecting mirror is disposed in the inner space of the tool holder, in which the second reflecting mirror is configured to reflect the laser light beam which is emitted into the inner space out through the light outlet.

According to an embodiment of the present invention, the mirror assembly includes a semi-transparent mirror, a first reflecting mirror, a second reflecting mirror and a third reflecting mirror. The semi-transparent mirror is disposed in the hollow passage of the tool holder. The semi-transparent mirror is configured to spit the laser light beam into a first light beam and a second light beam, in which the first light beam is reflected by the semi-transparent mirror into the inner space of the tool holder, and the second light beam travels along the hollow passage. The first reflecting mirror is disposed in the inner space of the tool holder, in which the first reflecting mirror is configured to reflect the first light beam which is emitted into the inner space out through the light outlet. The second reflecting mirror is disposed in the hollow passage of the tool holder, in which the second reflecting mirror is configured to reflect the second light beam into the inner space of the tool holder through the through hole. The third reflecting mirror is disposed in the inner space of the tool holder, in which the third reflecting mirror is configured to reflect the second light beam which is emitted into the inner space out through the light outlet.

According to an embodiment of the present invention, the laser light source is a continuous wave laser light source.

According to the aforementioned embodiments of the present invention, the present invention mainly integrates a laser heating device and an ultrasonic vibration device on a single shaft base to make the shaft apparatus have functions of both laser heating and ultrasonic vibration. The laser heating device is configured to pre-heat the workpiece in a processing area to reduce the mechanical strength of the material of the workpiece, thereby reducing the cutting force, so that the shaft apparatus is suitable for cutting high-strength or high-hardness workpieces such as superalloys or ceramic-based composite materials. The function of the ultrasonic vibration can vibrate the cutting tool in high-frequency to prevent chips from being stuck on the cutting tool and can resolve the problem of high temperature of the cutting tool due to the heating of the workpiece, thereby increasing life of the cutting tool. In addition, when it is necessary to process materials which cannot resist high-temperature heat, such as carbon fiber composite materials, only the ultrasonic vibration function is turned on with the laser heating function turned off, so as to meet different processing requirements of different materials.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
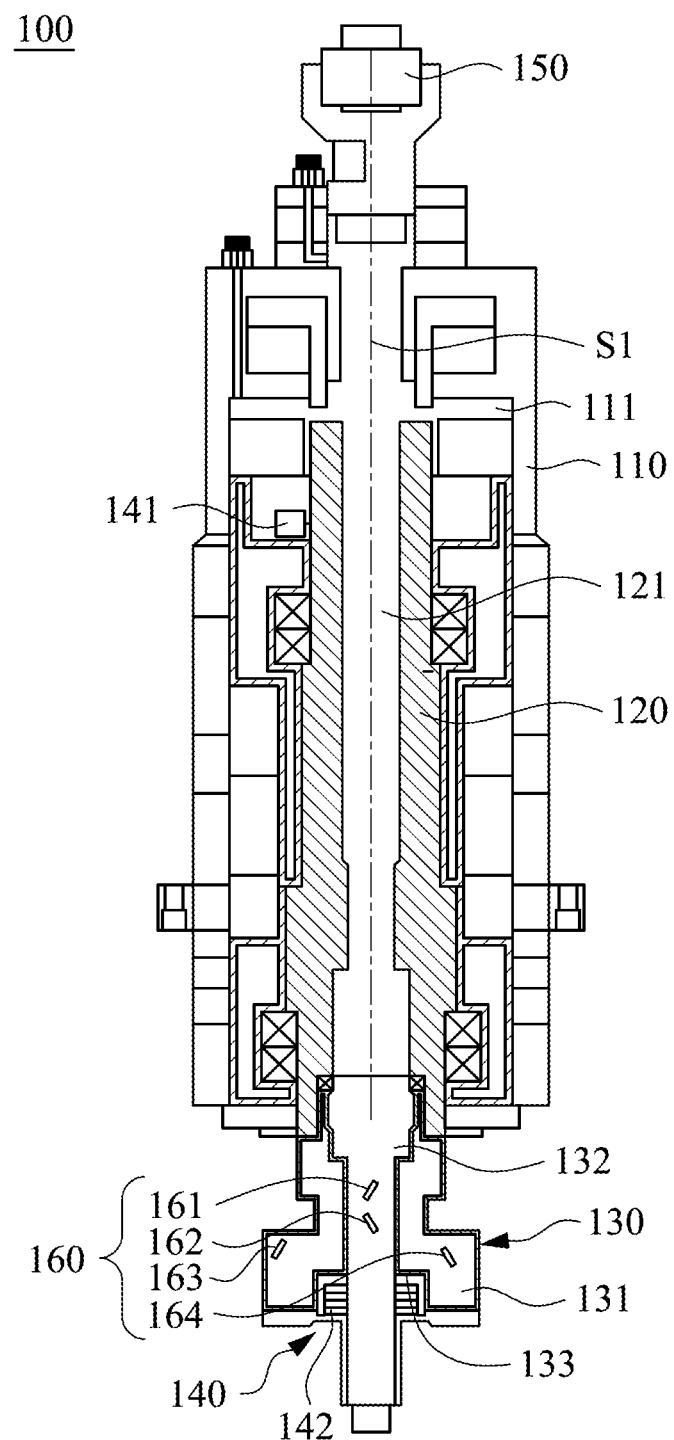
FIG. 1 is a schematic structural diagram showing a multifunctional shaft apparatus in accordance with an embodiment of the present invention.
Figure 2:
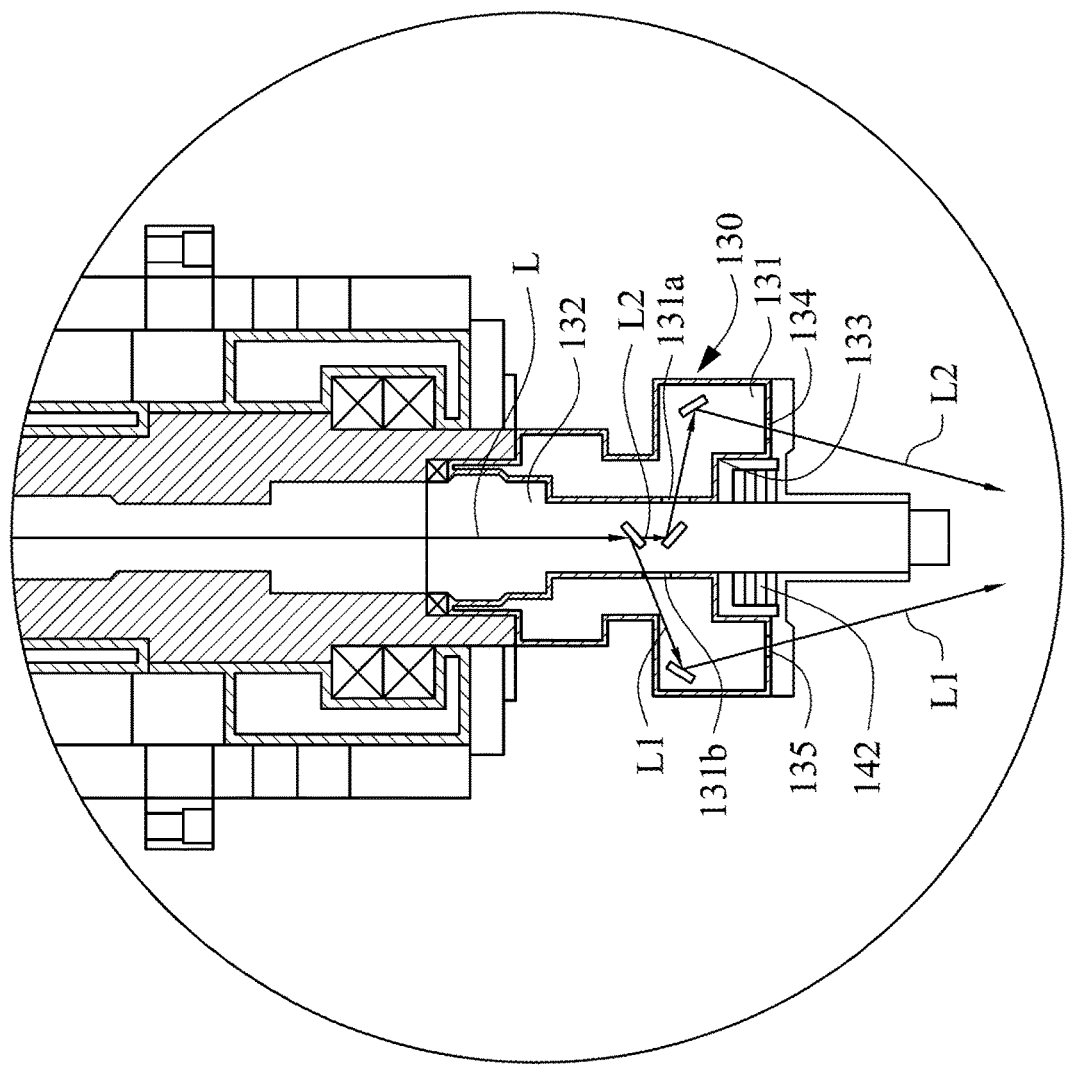
FIG. 2 is a schematic diagram showing an enlarged portion of the multifunctional shaft apparatus in accordance with an embodiment of the present invention.

Simultaneously referring to FIG. 1 and FIG. 2, FIG. 1 is a schematic structural diagram showing a multifunctional shaft apparatus 100 in accordance with an embodiment of the present invention, and FIG. 2 is a schematic diagram showing an enlarged portion of the multifunctional shaft apparatus 100 in accordance with an embodiment of the present invention. The multifunctional shaft apparatus 100 of the present embodiment is suitable to be installed on a processing machine. The multifunctional shaft apparatus 100 mainly includes a shaft base 110, a spindle 120, a tool holder 130, an ultrasonic vibration assembly 140, a laser light source 150 and a mirror assembly 160.

In the present embodiment, the shaft base 110 has an accommodating space 111. The spindle 120 is rotatably disposed in the accommodating space 111. The spindle 120 is a hollow structure which has a laser channel 121, and the laser channel 121 extends along an axis direction S1 of the spindle 120. The laser light source 150 is disposed on the shaft base 110, so as to provide laser light beam into the laser channel 121. In one embodiment, the laser light source 150 is a continuous wave laser light source.

Continuously referring to FIG. 1 and FIG. 2, the tool holder 130 is disposed on the spindle 120. The tool holder 130 is a hollow structure and has an inner space 131, a hollow passage 132 and a recessed portion 133. The hollow passage 132 of the tool holder 130 extends along the axis direction S1 and is communicated with the laser channel 121 of the spindle 120. Therefore, laser light beam L provided by the laser light source 150 passes through the laser channel 121 of the spindle 120 and emits to the hollow passage 132 of the tool holder 130. In the present embodiment, the mirror assembly 160 is disposed in the tool holder 130, and the mirror assembly 160 is mainly used to reflect the laser light beam L to emit the laser light beam L from a bottom surface of the tool holder 130.

As shown in FIG. 1 and FIG. 2, the mirror assembly 160 includes a semi-transparent mirror 161, a first reflecting mirror 162, a second reflecting mirror 163 and a third reflecting mirror 164. The semi-transparent mirror 161 and the first reflecting mirror 162 are disposed in the hollow passage 132 and are arranged along the axis direction S1, and the second reflecting mirror 163 and the third reflecting mirror 164 are disposed in the inner space 131 of the tool holder 130. In addition, in the present embodiment, an inner wall of the hollow passage 132 of the tool holder 130 has at least one through hole, such as through holes 131a and 131b, which are communicated with the inner space 131. The bottom surface of the tool holder 130 has light outlets 134 and 135. In the present embodiment, the disposition locations of the through hole 131a, the through hole 131b, the light outlet 134 and the light outlet 135 respectively correspond to the disposition locations of the first reflecting mirror 162, the semi-transparent mirror 161, the third reflecting mirror 164 and the second reflecting mirror 163.

Accordingly, when laser light beam L generated by the laser light source 150 emits to the semi-transparent mirror 161, one portion of the laser light beam L is reflected by the semi-transparent mirror 161 as a first light beam L1 which first passes through the through hole 131b and emits towards the second reflecting mirror 163 located in the inner space 131 of the tool holder 130, and the first light beam L1 is further reflected by the second reflecting mirror 163 to emit out of the tool holder 130 through light outlet 135. In addition, the other portion of the laser light beam L passes through the semi-transparent mirror 161 as a second light beam L2 which travels along the hollow passage 132 of the tool holder 130 to emit towards the first reflecting mirror 162, and the second light beam L2 is further reflected by the first reflecting mirror 162 to emit towards the third reflecting mirror 164 located in the inner space 131 of the tool holder 130, and then the second light beam L2 is reflected by the third reflecting mirror 164 to emit out of the tool holder 130 through the light outlet 134.

It is noted that, in the aforementioned embodiment, the semi-transparent mirror 161 is used in the mirror assembly 160 to split the laser light beam L into the first light beam L1 and the second light beam L2, and the reflecting mirrors (such as the first reflecting mirror 162, the second reflecting mirror 163 and the third reflecting mirror 164) are used to reflect the first light beam L1 and second light beam L2 to the outside of the tool holder 130 respectively. In other embodiments, the semi-transparent mirror 161 and the second reflecting mirror 163 may be omitted, that is, the mirror assembly 160 only includes the first reflecting mirror 162 located in the hollow passage 132 of the tool holder 130 and the third reflecting mirror 164 located in the inner space 131 of the hollow passage 132. Therefore, the laser light beam L provided by the laser light source 150 directly emits towards the first reflecting mirror 162 and is reflected by the first reflecting mirror 162 into the inner space 131, and then further be reflected by the third reflecting mirror 164 to emit out of the tool holder 130.

Continuously referring to FIG. 1 and FIG. 2, the ultrasonic vibration assembly 140 mainly includes a power supply 141 and a vibration member 142. In the present embodiment, the power supply 141 is disposed in the accommodating space 111 of the shaft base 110. The vibration member 142 is disposed in the recessed portion 133 which is recessed into the bottom surface of the tool holder 130. In one example, the power supply 141 is constituted by an electromagnetic receiving coil and an electromagnetic sending coil, and the vibration member 142 is a piezoelectric plate. In some embodiments, the spindle 120 and the tool holder 130 are conductive bodies, and the power supply 141 is electrically connected to the spindle 120 and the tool holder 130, thereby providing electric power to the vibration member 142. In other embodiments, electric wires can also be disposed in the accommodating space 111 and extends inside of the tool holder 130 to be electrically connected between the power supply 141 and the vibration member 142. In other examples, other elements disposed inside of the shaft base 110, such as a sleeve which is used to support the spindle 120, can be designed as a hollow shell structure to accommodate the electric wires. Therefore, when a cutting tool (not shown) is installed on the tool holder 130, the vibration member 142 generates high-frequency vibration to vibrate the cutting tool. By vibrating the cutting tool, cutting chips generated during the cutting process can be prevented from being stuck on the cutting tool, and the problem of high temperature of the cutting tool due to the heating of the workpiece can be also resolved.

It is noted that, because both the mirror assembly 160 and the vibration member 142 are disposed on the tool holder 130, it is convenient for users or manufacturers to adjust or replace the mirror assembly 160 and vibration member 142 according to different requirements, and it is also easy to maintain the tool holder. In addition, in other embodiments, mirror assemblies and vibration members on different tool holders may have different designs, such that the users and the manufacturers can directly change different tool holders to achieve different laser light and ultrasonic vibration requirements.

According to the aforementioned embodiments of the present invention, the present invention mainly integrates a laser heating device and an ultrasonic vibration device on a single shaft base to make the shaft apparatus have functions of both laser heating and ultrasonic vibration. The laser heating device is configured to pre-heat the workpiece in a processing area to reduce the mechanical strength of the material of the workpiece, thereby reducing the cutting force, so that the shaft apparatus is suitable for cutting high-strength or high-hardness workpieces such as superalloys or ceramic-based composite materials. The function of the ultrasonic vibration can vibrate the cutting tool in high-frequency to prevent chips from being stuck on the cutting tool and can resolve the problem of high temperature of the cutting tool due to the heating of the workpiece, thereby increasing life of the cutting tool. In addition, when it is necessary to process materials which cannot resist high-temperature heat, such as carbon fiber composite materials, only the ultrasonic vibration function is turned on with the laser heating function turned off, so as to meet different processing requirements of different materials.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multifunctional shaft apparatus, which is suitable to be installed on a processing machine, wherein the multifunctional shaft apparatus comprises:
    a shaft base having an accommodating space;
    a spindle disposed in the accommodating space, wherein the spindle has a laser channel extending along an axis direction of the spindle;
    a tool holder disposed on the spindle, wherein the tool holder has a hollow passage, an inner space and a recessed portion, the hollow passage extends along the axis direction and is communicated with the laser channel, and an inner wall of the hollow passage is set with at least one through hole which is communicated with the inner space, and the recessed portion is disposed on a bottom surface of the tool holder which is away from the spindle, wherein the bottom surface has a light outlet which is communicated with the inner space;
    an ultrasonic vibration assembly comprising a vibration member disposed in the recessed portion of the tool holder, and a power supply disposed in the accommodating space and electrically connected to the vibration member, wherein the spindle and the tool holder are conductive bodies, and the power supply is electrically connected to the spindle and the tool holder so as to provide electric power to the vibration member;
    a laser light source configured to generate a laser light beam; and
    a mirror assembly disposed in the tool holder, and the mirror assembly is configured to reflect the laser light beam, such that the laser light beam is emitted into the tool holder via the through hole and is further emitted out from the light outlet.

2. The multifunctional shaft apparatus of claim 1, wherein the mirror assembly comprises:
    a first reflecting mirror disposed in the hollow passage of the tool holder, wherein the first reflecting mirror is configured to reflect the laser light beam to the inner space of the tool holder through the through hole; and
    a second reflecting mirror disposed in the inner space of the tool holder, wherein the second reflecting mirror is configured to reflect the laser light beam which is emitted into the inner space out through the light outlet.

3. The multifunctional shaft apparatus of claim 1, wherein the mirror assembly comprises:
    a semi-transparent mirror disposed in the hollow passage of the tool holder, wherein the semi-transparent mirror is configured to spit the laser light beam into a first light beam and a second light beam, wherein the first light beam is reflected by the semi-transparent mirror into the inner space of the tool holder, and the second light beam travels along the hollow passage;
    a first reflecting mirror disposed in the hollow passage of the tool holder, wherein the first reflecting mirror is configured to reflect the second light beam which is emitted into the inner space of the tool holder through the light outlet through hole;
    a second reflecting mirror disposed in the inner space of the tool holder, wherein the second reflecting mirror is configured to reflect the first light beam out through the light outlet; and
    a third reflecting mirror disposed in the inner space of the tool holder, wherein the third reflecting mirror is configured to reflect the second light beam which is emitted into the inner space out through the light outlet.

4. The multifunctional shaft apparatus of claim 1, wherein the laser light source is a continuous wave laser light source.

* * * * *